(12) United States Patent
Schmutter

(10) Patent No.: US 7,887,898 B1
(45) Date of Patent: Feb. 15, 2011

(54) FIRE RESISTANT MATERIALS AND METHODS FOR PRODUCTION AND INSTALLATION

(76) Inventor: Bruce E. Schmutter, 182 Plymouth St., Brooklyn, NY (US) 11201

( * ) Notice: Subject to any disclaimer, the term of this patent is extended or adjusted under 35 U.S.C. 154(b) by 288 days.

(21) Appl. No.: 11/974,494

(22) Filed: Oct. 11, 2007

Related U.S. Application Data

(60) Provisional application No. 60/851,097, filed on Oct. 11, 2006.

(51) Int. Cl.
*B32B 3/04* (2006.01)
*B32B 3/10* (2006.01)
*B27N 9/00* (2006.01)

(52) U.S. Cl. ............... 428/121; 428/130; 428/920; 428/921; 442/136; 442/138

(58) Field of Classification Search ............... 442/136, 442/138; 428/920, 921, 121, 130
See application file for complete search history.

(56) References Cited

U.S. PATENT DOCUMENTS

| 6,730,802 B2 | 5/2004 | Shen et al. |
| 2005/0031843 A1* | 2/2005 | Robinson et al. ......... 428/293.4 |

OTHER PUBLICATIONS

U. Sorathia, et al., "Evaluation of Intumescent Coatings for Shipboard Fire Protection," Journal of Fire Sciences, Nov. 2003, vol. 21, No. 6, pp. 423-450.

* cited by examiner

*Primary Examiner*—Norca L Torres-Velazquez
(74) *Attorney, Agent, or Firm*—Nixon Peabody LLP

(57) ABSTRACT

The present invention provides light weight, cost effective flame, fire and heat resistant compositions and materials for use in a variety of applications, as well as methods for producing and installing the compositions and materials in a variety of settings.

17 Claims, 4 Drawing Sheets

FIRE RESISTANT MATERIALS AND METHODS FOR PRODUCTION AND INSTALLATION

CROSS-REFERENCE TO RELATED PATENT APPLICATION OR PRIORITY claim

This application claims the benefit of the Provisional Application No. 60/851,097, filed on Oct. 11, 2006, the disclosure of which is incorporated herein in its entirety by reference.

FIELD OF THE INVENTION

The present invention relates to light-weight, cost effective fire resistant materials and methods for their production and installation.

BACKGROUND OF THE INVENTION

Intelligent management of safety and access control issues is becoming increasingly important for all types of public and private facilities. Accordingly, an increasing number of facility appliances such as barriers (doors, windows, etc.), elevators, heating ventilation and air conditioning (HVAC) systems, power generation systems, alarms, fire dampers, and lighting systems are being equipped with sophisticated recognition and key systems. Another factor behind the increasing complexity of facility appliances is growing integration of entrances and exits with diverse building and management systems. Examples range from central fire alarm/emergency systems to time and attendance terminals and networked security devices that provide data to a common building monitoring database. In short, there is a growing recognition in the facility management industry of the escalating convergence between mechanical products, electronic components and software/information technology (IT) capabilities. Accordingly, in order to insure the safety of facility occupants in the event of a fire or catastrophic emergency, it is becoming increasingly important to protect these mechanical and electronic components from the heat and flame of a fire.

The use of intumescent materials, particularly as coatings, in some fire protection applications has proved unsatisfactory because, among other things they demonstrate poor adhesion to the substrate to be protected, flaking above certain temperatures, and also demonstrate significant vulnerability to damage caused by routine impact. Intumescent materials are generally considered inferior to batt or blanket type fibrous fire insulation such as mineral wool or StructoGuard®. U. Sorathia, et al., Evaluation of Intumescent Coatings for Shipboard Fire Protection, *J. Fire Sciences*, 00: 200 (Dec. 24, 2002). Batt or blanket type fire insulation materials, however present problems in that they are heavy, bulky, and generally very difficult to install. Additionally, batt or blanket type fire insulation materials are prone to detachment from the surfaces they are designed to protect as the heat from a fire degrades, expands or otherwise destroys the means by which they are typically attached to those surfaces.

SUMMARY OF THE INVENTION

The present invention provides a novel combination of fire resistant materials which allows for the use of intumescent materials having superior performance to blanket type fibrous fire insulation.

The present invention provides light-weight, cost effective fire and heat resistant materials as well as methods for their production and installation. The fire resistant materials provided by the present invention may be used in a wide array of applications from passive fire protection for structures, containers and sensitive electronic instruments, to fire protective clothing and shelters, to fire protective sleeves for air water and exhaust hoses. Further, the methods of production and installation of the fire resistant materials of the present invention offer the advantages of increased efficiency and cost effectiveness as compared to existing methods.

In one aspect, a multi-layer fire resistant composition comprises at least one heat reflective layer having a length, a width a first lateral surface and a second lateral surface; at least one impact-resistant mechanical support layer having a length, a width a first lateral surface and a second lateral surface; and at least one intumescent layer having a length, a width a first lateral surface and a second lateral surface, wherein at least one impact resistant mechanical support layer is positioned between a reflective layer and an intumescent layer.

The reflective layer can be selected from silica fiber, ceramic coated fiber, or any of numerous commercially available heat reflective materials currently known in the art. In a preferred embodiment, the heat reflective material is a fabric or other suitable substrate treated with a silicon carbide precursor as described in U.S. Pat. No. 6,730,802, which is incorporated by reference herein in its entirety. In another preferred embodiment the silicon carbide precursor treated fabric is a fiberglass fabric such as S-Glass fiber. The intumescent layer of the present invention may be expandable graphite, unexpanded vermiculite, hydrobiotite, hydrogel and/or mixtures thereof. In a preferred embodiment, the intumescent layer is expandable graphite.

The impact-resistant mechanical support layer can be any rigid material possessing acceptable thermal properties including, but not necessarily limited to stainless steel, nickel, copper, aluminum, brass, and alloys thereof. In a preferred embodiment, the impact-resistant mechanical support layer is stainless steel.

The layers of the multi-layered composition can be affixed together using any thermally suitable attachment. In one embodiment, the layers are affixed together by bending at least two opposing edges of the mechanical support layer such that the reflective layer and intumescent layer are fixed along their lengths by the bent edge of the mechanical layer.

In an embodiment, the multi-layered composition can be formed into a fire resistant panel, or ZPanel™ which can be attached to any structure or substrate in order to protect the structure or substrate from fire or heat.

Methods for installing the fire resistant panels are also taught. In one embodiment, the installation method comprises affixing the panel to a stationary object using an attachment means and a fire resistant belt, the fire resistant belt comprising at least one heat reflective layer having a length, a width a first lateral surface and a second lateral surface; at least one impact resistant mechanical support layer having a length, a width a first lateral surface and a second lateral surface; and at least one intumescent layer having a length, a width a first lateral surface and a second lateral surface, wherein the intumescent layer is positioned between the mechanical support layer and the heat reflective layer, and wherein the attachment means is positioned between the intumescent layer and the mechanical support layer. The attachment means may include any known thermally acceptable attachment means, including but are not limited to screws, bolts, pins, nails, staples, rivets and combinations thereof. In a preferred embodiment, the attachment means comprise one or more screws.

Fire protective materials can be useful in an array of applications. In a particular embodiment, a multi-layer fire resistant material is provided comprising at least one heat reflective layer having a length, a width a first lateral surface and a second lateral surface; and at least one intumescent layer having a length, a width a first lateral surface and a second lateral surface, wherein the at least one intumescent layer is positioned between a first reflective layer and a second reflective layer, and wherein the layers are affixed by a first attachment means able to withstand a temperature up to about 800° F. and a second attachment means able to withstand a temperature up to about 3000° F.

The reflective layer may be silica fiber, ceramic coated fiber, or any of numerous commercially available heat reflective materials currently known in the art. In a preferred embodiment, the heat reflective material is a fabric or other suitable substrate treated with a silicon carbide precursor as described in U.S. Pat. No. 6,730,802, which is incorporated by reference herein in its entirety. In an additional preferred embodiment the silicon carbide precursor treated fabric is a fiberglass fabric such as S-Glass fiber. The intumescent layer of the present invention may be expandable graphite, unexpanded vermiculite, hydrobiotite, hydrogel and/or mixtures thereof. In a preferred embodiment, the intumescent layer is expandable graphite. In a preferred embodiment, the attachment means is temperature sensitive thread.

In a particular embodiment, the layers of the fire resistant material are affixed in a quilted pattern, wherein a first reflective layer is affixed to a second reflective layer by a first attachment able to withstand a temperature up to about 800° F. and a second attachment able to withstand a temperature up to about 3000° F., and wherein the at least one intumescent layer is positioned between the first and second reflective layers.

In a further embodiment, an article of fabric is provided which comprises more than one layer of abrasive resistant fabric having a length, a width a first lateral surface and a second lateral surface; wherein the quilted fabric described above is positioned between the layers of abrasive resistant fabric. Many different articles can be fashioned using this material including but not limited to shirts, jackets, coats, trousers, aprons, underwear, overalls, coveralls, jumpsuits, uniforms, hats, helmets, helmet liners, gloves, mittens, socks, shoes, and boots. In one embodiment, the article is a protective cover for a hose. In another embodiment, the article is selected from the group consisting of: tents, shelters, awnings, and sleeping bags. In still another embodiment, the article is a protective cover for an appliance which may be selected from the group consisting of: sensors, receivers, transmitters, computers, batteries, storage compartments, storage tanks, generators, motors and combinations thereof.

In summary the present invention provides light-weight, cost effective fire resistant materials as well as methods for their production and installation. The fire resistant materials provided by the present invention can be used in a wide array of applications from passive fire protection for structures, containers and sensitive electronic instruments, to fire protective clothing and shelters, to fire protective sleeves for air water and exhaust hoses.

Additional aspects of the present invention will be apparent in view of the description which follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 (A) depicts the model enclosing an electronic device (radio); and FIG. 3 (B) depicts the thermally fortified model being heated on two opposing sides by propane torches.

DETAILED DESCRIPTION OF THE INVENTION

Figure 1:
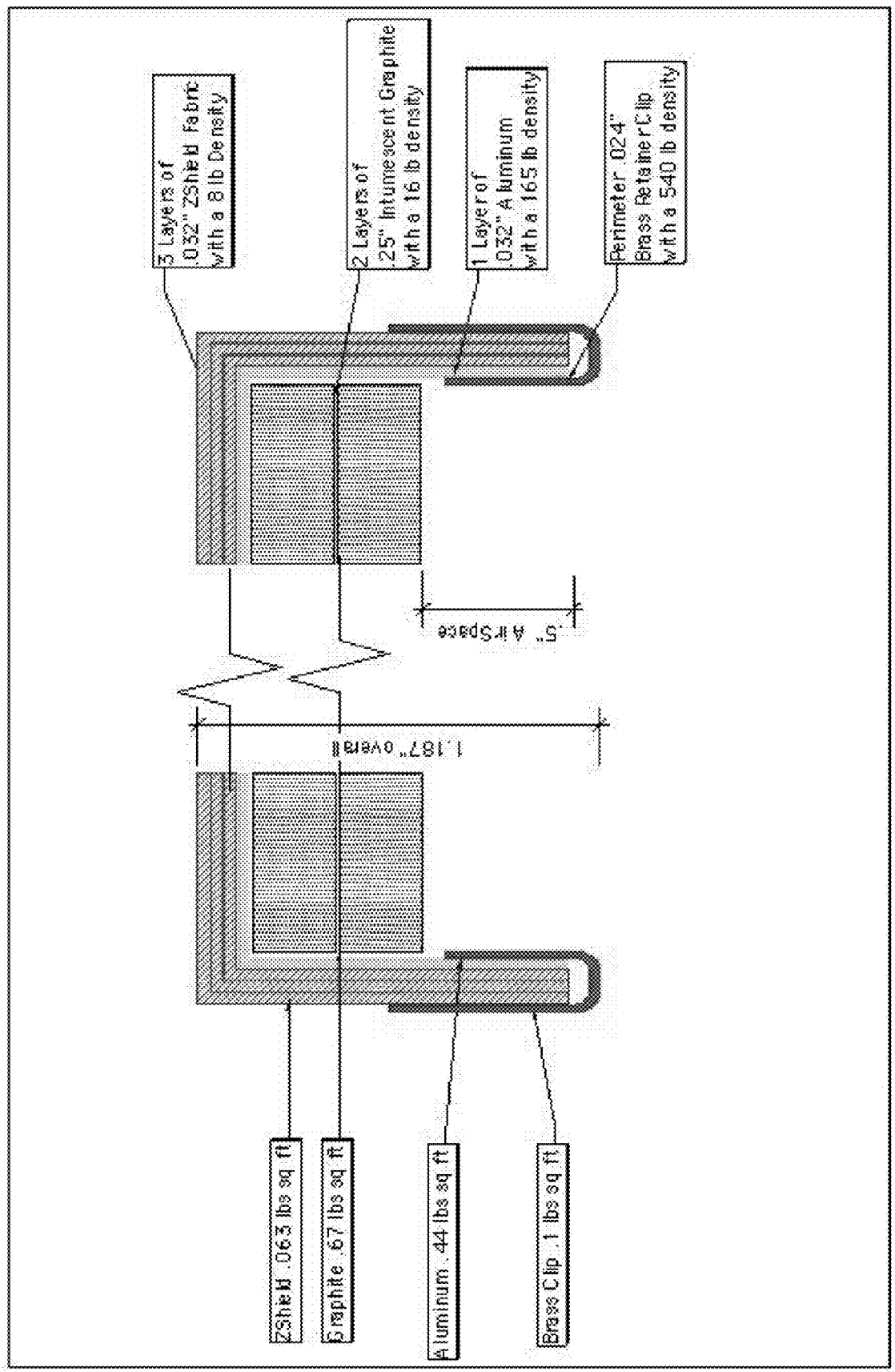
FIG. 1 is a schematic showing the design of a fire protective ZShield Panel™ in accordance with one embodiment.

Embodiments of the present invention are described herein in the context of a method, system and apparatus for providing light weight, cost effective flame, fire and heat resistant compositions and materials for use in a wide variety of applications. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In one aspect, a multi-layer fire resistant composition comprises at least one heat reflective layer having a length, a width a first lateral surface and a second lateral surface; at least one impact-resistant mechanical support layer having a length, a width a first lateral surface and a second lateral surface; and at least one intumescent layer having a length, a width a first lateral surface and a second lateral surface, wherein at least one impact resistant mechanical support layer is positioned between a reflective layer and an intumescent layer.

The reflective layer can be selected from silica fiber, ceramic coated fiber, or any of numerous commercially available heat reflective materials currently known in the art. In a preferred embodiment, the heat reflective material is a fabric or other suitable substrate treated with a silicon carbide precursor as described in U.S. Pat. No. 6,730,802, which is incorporated by reference herein in its entirety. In another preferred embodiment the silicon carbide precursor treated fabric is a fiberglass fabric such as S-Glass fiber.

As used herein, the term "intumescent" refers to materials which expand or swell as a result of exposure to heat, thus increasing in volume and decreasing in density. The intumescent layer of the present invention may be expandable graphite, unexpanded vermiculite, hydrobiotite, hydrogel and/or mixtures thereof. In a preferred embodiment, the intumescent layer is expandable graphite.

The impact-resistant mechanical support layer can be any rigid material possessing acceptable thermal properties including, but not necessarily limited to stainless steel, nickel, copper, aluminum, brass, and alloys thereof. In a preferred embodiment, the impact-resistant mechanical support layer is stainless steel.

The layers of the multi-layered composition can be affixed together using any thermally suitable attachment including but not necessarily limited to screws, bolts, pins, nails, staples, rivets and combinations thereof. In one embodiment, the layers are affixed together by bending at least two opposing edges of the mechanical support layer such that the reflective layer and intumescent layer are fixed along their lengths by the bent edge of the mechanical layer.

In an embodiment, the multi-layered composition can be formed into a fire resistant panel, or ZPanel™ which can be attached to any structure or substrate in order to protect the structure or substrate from fire or heat.

Figure 2:
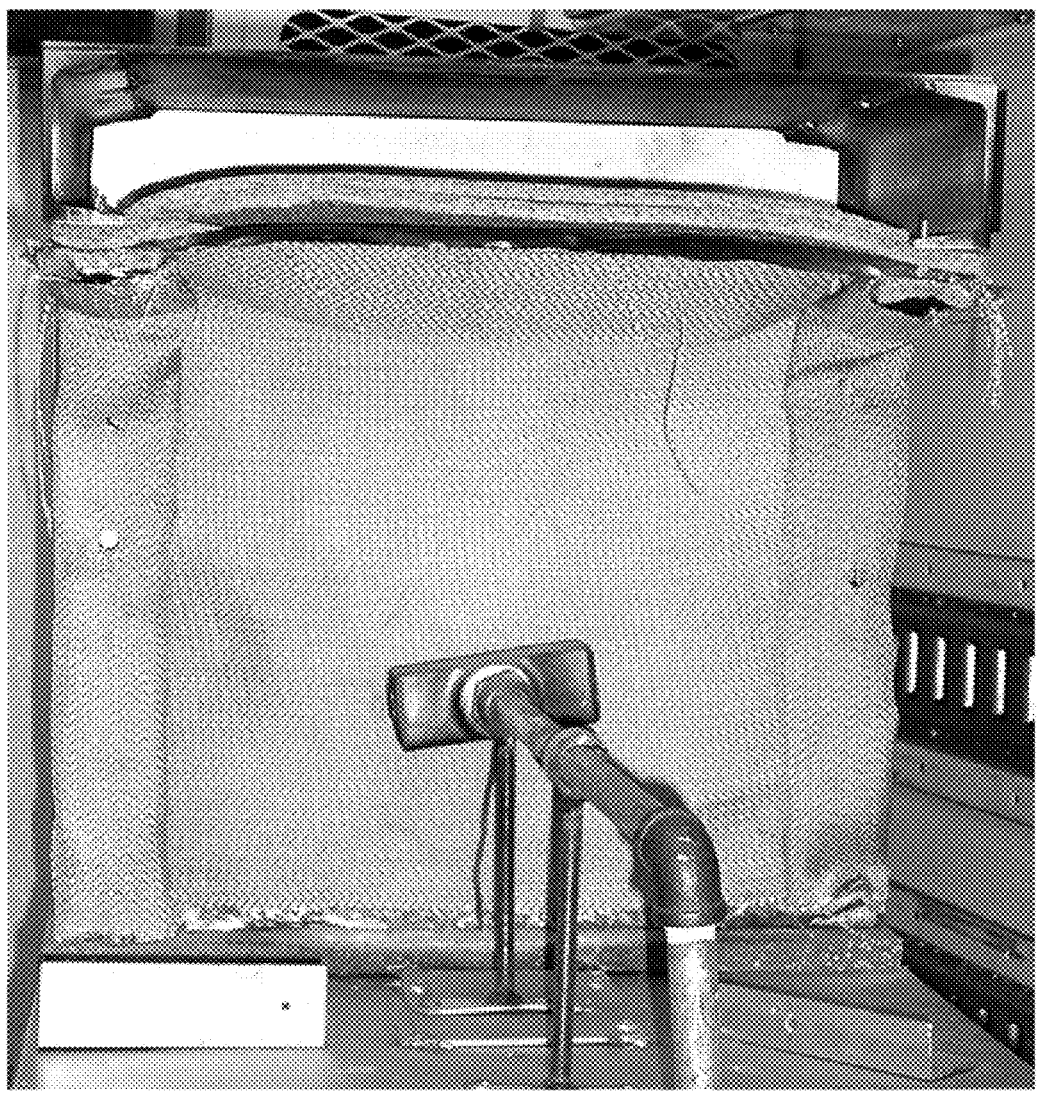
FIG. 2 shows a fire protective panel and an installation belt in accordance with another embodiment.

A method for installing the fire resistant panels, in one embodiment, comprises affixing the panel to a stationary object using an attachment and a fire resistant belt, the fire resistant belt comprising at least one heat reflective layer having a length, a width a first lateral surface and a second lateral surface; at least one impact resistant mechanical support layer having a length, a width a first lateral surface and a second lateral surface; and at least one intumescent layer having a length, a width a first lateral surface and a second lateral surface, wherein the intumescent layer is positioned between the mechanical support layer and the heat reflective layer, and wherein the attachment is positioned between the intumescent layer and the mechanical support layer. The attachment used in the installation methods may include any known thermally acceptable attachment means, including but are not limited to screws, bolts, pins, nails, staples, rivets and combinations thereof. In a preferred embodiment, the attachment means comprise one or more screws. FIG. 2 shows a fire protective panel and an installation belt in accordance with one embodiment.

Positioning the attachment between the intumescent layer and the mechanical support layer provides the additional advantage of protecting the attachment from any heat generated by a fire. Accordingly, in the event of an intense fire, the panels will remain attached to walls and other substrates significantly longer than fire protective panels in which the attachment means are not shielded from the heat and flame of a fire.

Fire protective materials can be useful in an array of applications. In a particular embodiment, a multi-layer fire resistant material is provided comprising at least one heat reflective layer having a length, a width, a first lateral surface and a second lateral surface; and at least one intumescent layer having a length, a width, a first lateral surface and a second lateral surface, wherein the at least one intumescent layer is positioned between a first reflective layer and a second reflective layer, and wherein the layers are affixed by a first attachment able to withstand a temperature up to about 800° F. and a second attachment able to withstand a temperature up to about 3000° F.

The reflective layer may be silica fiber, ceramic coated fiber, or any of numerous commercially available heat reflective materials currently known in the art. In a preferred embodiment, the heat reflective material is a fabric or other suitable substrate treated with a silicon carbide precursor as described in U.S. Pat. No. 6,730,802, which is incorporated by reference herein in its entirety. In an additional preferred embodiment the silicon carbide precursor treated fabric is a fiberglass fabric such as S-Glass fiber. The intumescent layer of the present invention may be expandable graphite, unexpanded vermiculite, hydrobiotite, hydrogel and/or mixtures thereof. In a preferred embodiment, the intumescent layer is expandable graphite.

In a particular embodiment, the layers of the fire resistant material are affixed in a quilted pattern, wherein a first reflective layer is affixed to a second reflective layer by a first attachment able to withstand a temperature up to about 800° F. and a second attachment able to withstand a temperature up to about 3000° F., and wherein the at least one intumescent layer is positioned between the first and second reflective layers. The dual attachment allows the intumescent material to expand as the temperature increases, thus optimizing its insulating features. Specifically, at temperatures from about 800° F., the first means of attachment, such as thread stitching degrades from the heat. This allows a greater area in which the intumescent material can expand.

In a further embodiment, an article of fabric is provided which comprises more than one layer of heat and abrasive resistant fabric having a length, a width a first lateral surface and a second lateral surface; wherein the quilted fabric described above is positioned between the layers of abrasive resistant fabric. In one embodiment, the abrasive resistant fabric is Kevlar. In another embodiment the flame/heat and abrasive resistant fabric is PBI Matrix (polybenzimidazole) which is commercially available from PBI Performance Products, Inc., 9800-D Southern Pines Blvd., Charlotte, N.C. 28273.

Many different articles can be fashioned using this material including but not limited to apparel (ZShield Apparel™) such as, for example, shirts, jackets, coats, trousers, aprons, underwear, overalls, coveralls, jumpsuits, uniforms, hats, helmets, helmet liners, gloves, mittens, socks, shoes, and boots. In one embodiment, the article is a protective cover for a hose. In another embodiment, the article is selected from the group consisting of: tents, shelters, awnings, and sleeping bags. In still another embodiment, the article is a protective cover for an appliance such as for example, and electronic or other appliances, which may be selected from the group consisting of: sensors, receivers, transmitters, computers, batteries, storage compartments, storage tanks, generators, motors and combinations thereof.

Fire resistant/protective panels (ZShield™ Panels) are provided in accordance with a particular embodiment which can be used to provide protective thermal layer for many types of substrates, structures and appliances. FIGS. 1 and 2 illustrate the design of a fire resistant panel in accordance with particular embodiments of the present invention. The panels of the present invention (ZShield™ Panels) have been tested in accordance with Underwriters Laboratories (UL) #1709 to 2000 degrees F. for two hours.

In a particular embodiment, the panels are affixed to the outer surfaces of an elevator cab to protect and insulate the cab, its key components and the elevator cab occupants. Accordingly, use of the fire resistant panels can transform the elevator cab into a viable escape/rescue/evacuation vehicle which can be used to save lives in the event of a fire. The panels can be used on virtually any structure or other substrate in need of protection from fire and/or heat.

The following Examples, which are set forth to aid in the understanding, should not be construed to limit in any way the scope of the invention as defined in the claims which follow thereafter.

EXAMPLES

Example 1

Figure 4:
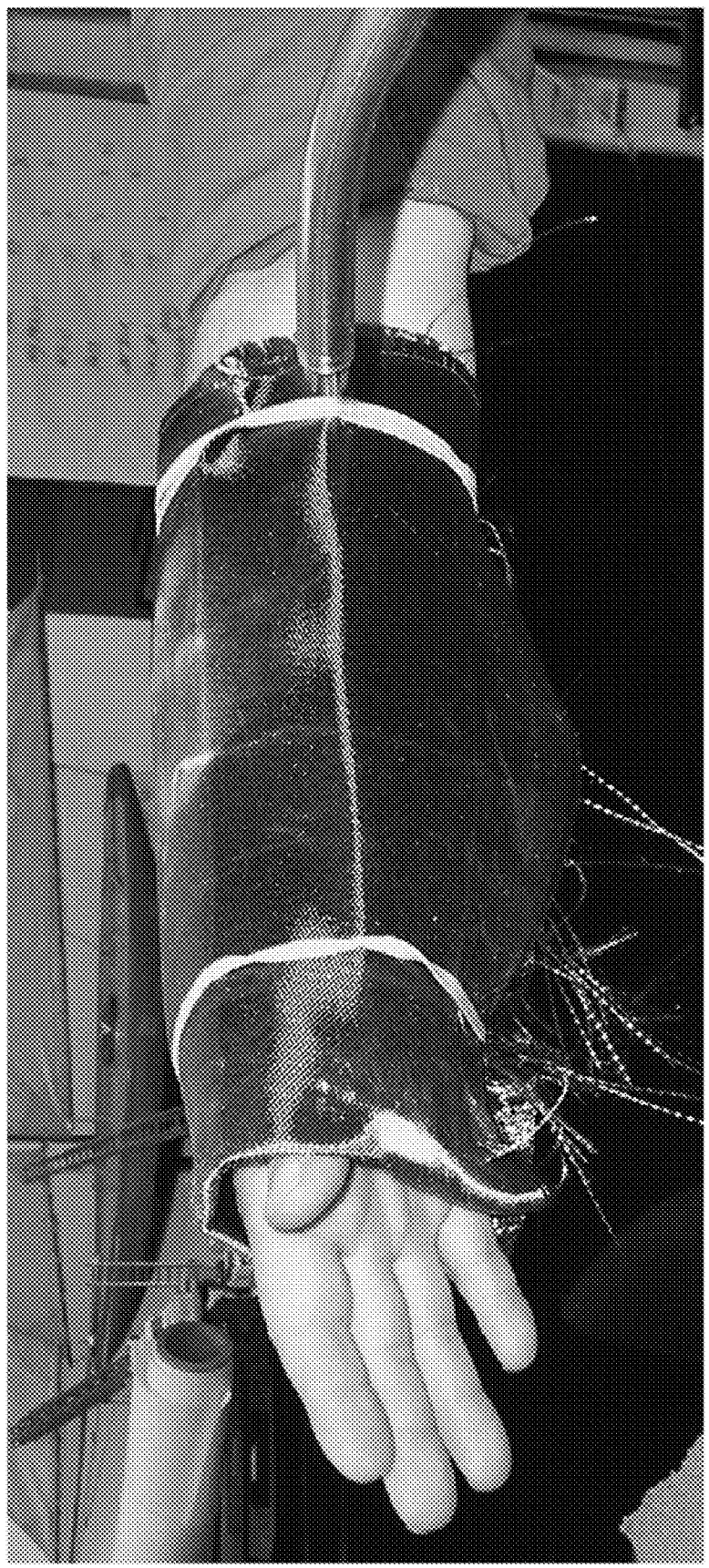
FIG. 4 shows a model of an article of apparel (jacket sleeve) being heated for 10 minutes at 650° C.±50° C.

FIG. 4 shows an example of the fire and heat protective properties of the apparel. In one test, a model sleeve was constructed out of the materials to cover the forearm of a test subject. The test subject donned the sleeve, and a propane torch was then applied to an isolated section of the sleeve for approximately 10 minutes. The sleeve surface temperature at the point at which the torch was directed reached approximately 650° C.±50° C., and this temperature was maintained for at least 10 minutes. The rise in temperature of the subject's sleeve-covered arm during this time period was negligible. After exposure to temperatures of approximately 650°-700° C. for 10 minutes, the subject's forearm suffered no damage.

Example 2

Figure 3:
FIG. 3 shows a model of an elevator cab thermally fortified by fire resistant/protective panels.
Figure 3:
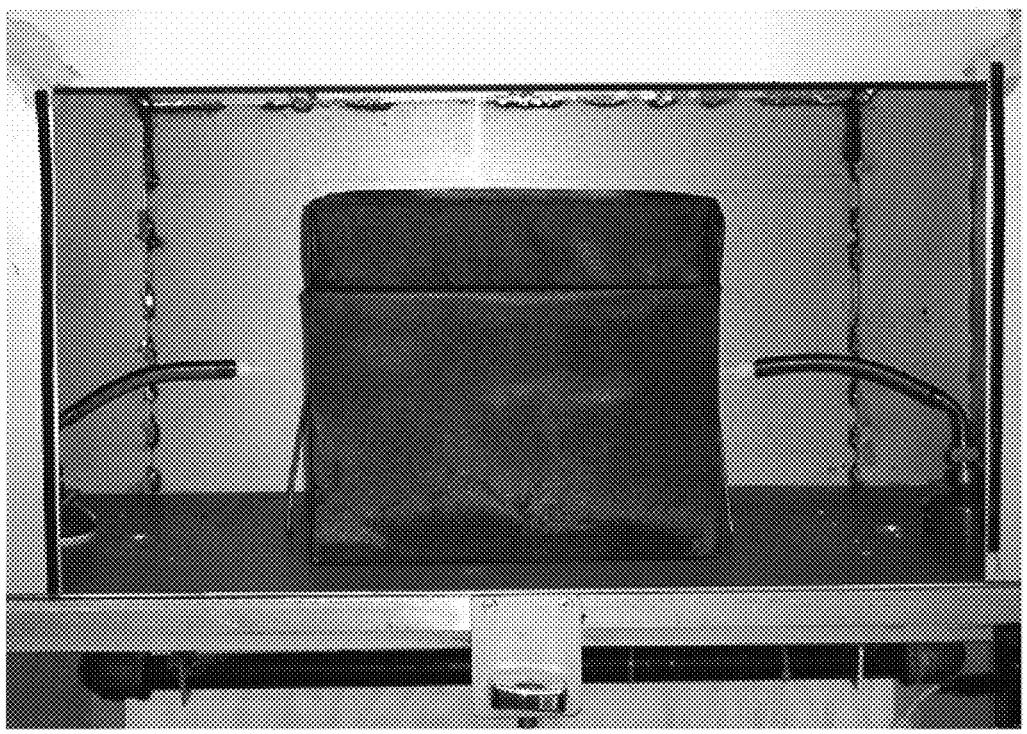

FIG. 3 shows a model of an elevator cab thermally fortified by above described fire protective panels. FIG. 3A depicts the model enclosing an electronic device (radio). FIG. B depicts the thermally fortified model being heated on two opposing sides by propane torches. An elevator cab model was thermally fortified with fire resistant panels. The model was then subjected to flame/heat testing by directing a propane torch flame at the external panel wall of the model. The temperature of the outer panel wall, the inner wall of the elevator cab model, and the ambient temperature of the elevator cab interior were then measured and recorded over a 45 second period of time. The following results in which fractional degrees can be disregarded, were obtained.

| Time (sec.) | Torch C. ° | Outer Wall C. ° | Inner Wall C. ° | Elevator C. ° |
| --- | --- | --- | --- | --- |
| 0.000 | 853.2305298 | 996.0245972 | 24.19029427 | 22.78323364 |
| 0.455 | 853.847229 | 996.2468872 | 24.19378281 | 22.77133369 |
| 0.910 | 853.1057129 | 995.6574707 | 24.21267319 | 22.78677368 |
| 1.365 | 852.4052124 | 994.7366333 | 24.20826912 | 22.79484749 |
| 1.820 | 852.3605347 | 995.2176514 | 24.20612717 | 22.79928589 |
| 2.275 | 852.0734253 | 994.7584229 | 24.21707344 | 22.76522064 |
| 2.730 | 851.3179321 | 994.6942139 | 24.22913551 | 22.78854561 |
| 3.185 | 852.038208 | 995.043396 | 24.23361588 | 22.78548813 |
| 3.640 | 851.7850952 | 994.5483398 | 24.22591019 | 22.77503777 |
| 4.095 | 852.5463867 | 994.913147 | 24.24528313 | 22.79409027 |
| 4.550 | 852.8949585 | 995.1989746 | 24.21121597 | 22.77940979 |
| 5.005 | 853.7736816 | 995.4168091 | 24.21699142 | 22.75398064 |
| 5.460 | 854.0075684 | 994.9135132 | 24.21202469 | 22.77553177 |
| 5.915 | 854.1001587 | 995.4576416 | 24.20519447 | 22.77625465 |
| 6.370 | 854.0657349 | 995.2685547 | 24.19600296 | 22.75190353 |
| 6.825 | 853.9192505 | 995.0814819 | 24.21101379 | 22.75905991 |
| 7.280 | 853.9844971 | 995.3299561 | 24.2112999 | 22.74516487 |
| 7.735 | 853.6412964 | 994.9202271 | 24.21122742 | 22.76000595 |
| 8.190 | 853.6337891 | 995.0690918 | 24.21803856 | 22.75913239 |
| 8.645 | 853.7512207 | 994.8806763 | 24.23934364 | 22.77283287 |
| 9.100 | 854.5319824 | 995.2780151 | 24.24973488 | 22.75350571 |
| 9.555 | 855.2712402 | 995.1361084 | 24.22347832 | 22.76440811 |
| 10.010 | 855.4230347 | 995.5760498 | 24.23456764 | 22.72739983 |
| 10.465 | 855.1596069 | 995.6223755 | 24.20874596 | 22.73494148 |
| 10.920 | 855.1419678 | 995.6116943 | 24.20208931 | 22.77658653 |
| 11.375 | 855.3327637 | 995.666687 | 24.24438667 | 22.75194931 |
| 11.830 | 856.0608521 | 995.9459229 | 24.25903511 | 22.74797821 |
| 12.285 | 856.2632446 | 996.024231 | 24.24204445 | 22.77186012 |
| 12.740 | 856.9157715 | 995.8810425 | 24.28134918 | 22.77015305 |
| 13.195 | 856.8131104 | 995.8330078 | 24.30197906 | 22.79481125 |
| 13.650 | 856.9656982 | 995.9934692 | 24.27495193 | 22.80806923 |
| 14.105 | 856.4744873 | 996.107605 | 24.27827072 | 22.77812004 |
| 14.560 | 856.2264404 | 995.2749634 | 24.2846241 | 22.78532219 |
| 15.015 | 855.5494995 | 994.821106 | 24.28876877 | 22.77705002 |
| 15.470 | 854.7866821 | 994.7017212 | 24.31080627 | 22.78091049 |
| 15.925 | 854.4093628 | 994.5114136 | 24.30118561 | 22.7829361 |
| 16.380 | 854.9876099 | 995.0429077 | 24.3001194 | 22.78886032 |
| 16.835 | 855.3442383 | 994.5378418 | 24.28601456 | 22.74917793 |
| 17.290 | 854.8839722 | 994.821106 | 24.31880188 | 22.76652145 |
| 17.745 | 855.3215332 | 994.3915405 | 24.3143692 | 22.76588631 |
| 18.200 | 854.5048218 | 994.1549683 | 24.27789497 | 22.77774811 |
| 18.655 | 854.3235474 | 994.2349854 | 24.32673264 | 22.80879402 |
| 19.110 | 854.3623047 | 994.6576538 | 24.35380363 | 22.78707123 |
| 19.565 | 854.5700684 | 994.4666748 | 24.30138588 | 22.7896328 |
| 20.020 | 854.8849487 | 995.1630859 | 24.32031441 | 22.75710297 |
| 20.475 | 854.7815552 | 995.3591919 | 24.34753418 | 22.78463364 |
| 20.930 | 855.9578857 | 995.5343018 | 24.35447311 | 22.79577637 |
| 21.385 | 855.9418335 | 995.6855469 | 24.32235527 | 22.75937843 |
| 21.840 | 855.1439209 | 995.1047974 | 24.31615257 | 22.76076508 |
| 22.295 | 855.2600708 | 994.7264404 | 24.29413223 | 22.76813889 |
| 22.750 | 854.7565918 | 994.6589355 | 24.30603218 | 22.77202034 |
| 23.205 | 855.6500244 | 995.239502 | 24.30548096 | 22.75735855 |
| 23.660 | 856.2645264 | 995.1523438 | 24.30954361 | 22.76833534 |
| 24.115 | 856.7103882 | 995.1212769 | 24.32731819 | 22.7745266 |
| 24.570 | 857.0442505 | 994.9343872 | 24.34413338 | 22.80748367 |
| 25.025 | 857.9573975 | 995.572937 | 24.36939812 | 22.82162476 |
| 25.480 | 857.9816895 | 995.7353516 | 24.40778542 | 22.83358765 |
| 25.935 | 858.8410034 | 995.7857056 | 24.35978699 | 22.78155899 |
| 26.390 | 859.3467407 | 996.0501099 | 24.38960457 | 22.81492424 |
| 26.845 | 859.3826294 | 996.2443237 | 24.3851757 | 22.81821632 |
| 27.300 | 859.6045532 | 995.9407959 | 24.37287521 | 22.79094124 |
| 27.755 | 859.5314941 | 995.9348145 | 24.47898102 | 22.86767769 |
| 28.210 | 858.4463501 | 995.8682861 | 24.37962723 | 22.81172371 |
| 28.665 | 859.524292 | 995.7734375 | 24.41440392 | 22.81349564 |
| 29.120 | 861.0950928 | 996.4199829 | 24.38837433 | 22.81391335 |
| 29.575 | 861.9293213 | 997.1656494 | 24.44430351 | 22.82991219 |
| 30.030 | 859.3651123 | 996.3067627 | 24.42723274 | 22.85656548 |
| 30.485 | 856.4071655 | 995.7469482 | 24.47783089 | 22.86194229 |
| 30.940 | 853.803772 | 995.1270752 | 24.53867912 | 22.85692596 |
| 31.395 | 853.9830933 | 993.7315674 | 24.53971672 | 22.84986687 |
| 31.850 | 857.3027344 | 995.7745972 | 24.51657295 | 22.85309982 |
| 32.305 | 856.8984985 | 998.3631592 | 24.50602531 | 22.84617805 |
| 32.760 | 851.3661499 | 1000.637146 | 24.51793861 | 22.86830902 |
| 33.215 | 840.098938 | 1002.934753 | 24.50639153 | 22.87281036 |
| 33.670 | 828.0535278 | 1003.66095 | 24.48082542 | 22.85802841 |
| 34.125 | 813.3970337 | 1004.620667 | 24.48329163 | 22.85263443 |
| 34.580 | 770.50354 | 1008.068054 | 24.45578575 | 22.85866165 |
| 35.035 | 740.1726074 | 1010.675293 | 24.48497963 | 22.88055801 |
| 35.490 | 715.4248047 | 1012.785706 | 24.4777317 | 22.89938736 |
| 35.945 | 695.8613281 | 1014.298889 | 24.51280785 | 22.89064026 |
| 36.400 | 681.4026489 | 1016.103882 | 24.50095558 | 22.9083271 |
| 36.855 | 670.9209595 | 1017.836182 | 24.48572731 | 22.89264679 |
| 37.310 | 662.5942993 | 1019.064026 | 24.4983654 | 22.8946476 |
| 37.765 | 655.7973022 | 1019.38092 | 24.50187111 | 22.89742088 |
| 38.220 | 648.1428833 | 1020.354675 | 24.48531151 | 22.90738487 |
| 38.675 | 642.7352295 | 1020.61554 | 24.46566391 | 22.88064194 |
| 39.130 | 640.543335 | 1020.592896 | 24.46187019 | 22.88376808 |
| 39.585 | 636.6328735 | 1020.466003 | 24.46578026 | 22.90610313 |
| 40.040 | 635.3103638 | 1020.337585 | 24.50582314 | 22.92772865 |
| 40.495 | 629.5845337 | 1020.290039 | 24.50449753 | 22.93373871 |
| 40.950 | 625.2539673 | 1020.187805 | 24.52105713 | 22.91661453 |
| 41.405 | 620.3901367 | 1021.467468 | 24.52408409 | 22.92749405 |
| 41.860 | 618.322937 | 1021.276428 | 24.5514164 | 22.95810699 |
| 42.315 | 611.5463257 | 1020.900818 | 24.53150368 | 22.93078613 |
| 42.770 | 606.1734009 | 1020.30304 | 24.5065918 | 22.92537498 |
| 43.225 | 600.2171021 | 1020.542908 | 24.53640747 | 22.93600464 |
| 43.680 | 596.3392334 | 1019.478577 | 24.54874802 | 22.96395302 |
| 44.135 | 593.5794067 | 1019.906494 | 24.56643677 | 22.96982193 |
| 44.590 | 590.3815308 | 1019.74408 | 24.53275871 | 22.95498276 |
| 45.045 | 589.6100464 | 1019.651611 | 24.53237724 | 22.91693115 |

These results show that although the outer wall of the model reached temperatures exceeding 1000° C., the temperatures of inner wall of the elevator cab and the ambient temperature of the elevator cab interior did not increase, but remained relatively constant. These data demonstrate that thermal fortification with the fire protective panels of the present invention can not only prevent an elevator cab from burning, it can prevent the temperature of the inside of the elevator from rising, thus protecting the contents of the elevator cab from any heat damage in the event of a fire. In short, the data show that thermal fortification can transform an elevator from a death trap into a viable escape device which can preserve human life in even the most extreme fires.

All publications, patents and patent applications mentioned in this specification are herein incorporated by reference into the specification to the same extent as if each individual publication, patent or patent application was specifically and individually indicated to be incorporated herein by reference.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

Those skilled in the art will recognize, or be able to ascertain, many equivalents to the embodiments of the inventions described herein. Such equivalents are intended to be encompassed by the following claims.

What is claimed is:

1. A multi-layer fire resistant composition comprising:
   (a) at least one heat reflective layer having a length, a width a first lateral surface and a second lateral surface;
   (b) at least one impact-resistant mechanical support layer having a length, a width a first lateral surface and a second lateral surface, wherein the impact-resistant mechanical support layer comprises a material selected from the group consisting of: stainless steel, nickel, copper, aluminum, brass, and alloys thereof; and
   (c) at least one intumescent layer having a length, a width a first lateral surface and a second lateral surface,
   wherein the at least one impact resistant mechanical support layer is positioned between a reflective layer and an intumescent layer, and
   wherein the at least one heat reflective layer, at least one impact-resistant mechanical layer and at least one intumescent layer are affixed together by bending at least two opposing edges of the at least one impact-resistant mechanical support layer such that the at least one heat reflective layer and at least one intumescent layer are fixed along their lengths by the bent edge of the mechanical layer.

2. The composition of claim 1, wherein the reflective layer comprises a material selected from the group consisting of: silica fiber and ceramic coated fiber.

3. The composition of claim 1, wherein the reflective layer comprises ceramic coated fiber.

4. The composition of claim 1, wherein the intumescent layer comprises a material selected from the group consisting of: expandable graphite, unexpanded vermiculite, hydrobiotite, and mixtures thereof.

5. The composition of claim 1, wherein the intumescent layer comprises expandable graphite.

6. The composition of claim 1, wherein the intumescent layer comprises vermiculite.

7. The composition of claim 6, wherein the impact-resistant mechanical support layer is stainless steel.

8. The composition of claim 1, wherein the composition forms a fire resistant panel.

9. A method for installing a panel having (a) at least one heat reflective layer having a length, a width a first lateral surface and a second lateral surface; (b) at least one impact-resistant mechanical support layer having a length, a width a first lateral surface and a second lateral surface; and (c) at least one intumescent layer having a length, a width a first lateral surface and a second lateral surface, wherein the at least one impact resistant mechanical support layer is positioned between a reflective layer and an intumescent layer, the method comprising:
   affixing the panel to a stationary object using an attachment and a fire resistant belt, the fire resistant belt comprising: at least one heat reflective layer having a length, a width a first lateral surface and a second lateral surface; at least one impact resistant mechanical support layer having a length, a width a first lateral surface and a second lateral surface; and at least one intumescent layer having a length, a width a first lateral surface and a second lateral surface, wherein the intumescent layer is positioned between the mechanical support layer and the heat reflective layer, and wherein the attachment is positioned between the intumescent layer and the mechanical support layer.

10. A multi-layer fire resistant material comprising:
    a first reflective layer;
    a second reflective layer; and
    at least one intumescent layer having a length, a width a first lateral surface and a second lateral surface, wherein the at least one intumescent layer is positioned between the first reflective layer and the second reflective layer, and wherein the layers are affixed by a first attachment able to withstand a temperature up to about 800° F. and a second attachment able to withstand a temperature up to about 3000° F.

11. The material of claim 10, wherein the reflective layer comprises a material selected from the group of consisting of: silica fiber and ceramic coated fiber.

12. The material of claim 10, wherein the reflective layer comprises ceramic coated fiber.

13. The material of claim 10, wherein the intumescent layer comprises a material selected from the group consisting of: expandable graphite, unexpanded vermiculite, hydrobiotite, and mixtures thereof.

14. The material of claim 10, wherein the intumescent layer comprises expandable graphite.

15. The material of claim 10, wherein the intumescent layer comprises vermiculite.

16. The material of claim 10, wherein the first and second attachment are selected from the group consisting of: thread, staples, rivets and combinations thereof.

17. The material of claim 10, wherein the layers are affixed in a quilted pattern.

* * * * *